US005787787A

United States Patent [19]

Kim et al.

[11] Patent Number: 5,787,787

[45] Date of Patent: Aug. 4, 1998

[54] ENGINE/PUMP CONTROL DEVICE FOR LOADERS

[75] Inventors: Joo Kyung Kim; Joong Woo Lee; Ho Jin Kang, all of Changwon, Rep. of Korea

[73] Assignee: Samsung Heavy Industries Co., Ltd., Rep. of Korea

[21] Appl. No.: 762,916

[22] Filed: Dec. 10, 1996

[30] Foreign Application Priority Data

May 30, 1996 [KR] Rep. of Korea .................. 1996-18819

[51] Int. Cl.[6] ............................ F15B 13/16; F16D 31/02

[52] U.S. Cl. ................................ 91/361; 60/468; 60/494; 60/328

[58] Field of Search ................................ 91/361; 60/328, 60/468, 494

[56] References Cited

U.S. PATENT DOCUMENTS

| | | | |
|---|---|---|---|
| 4,015,482 | 4/1977 | Ito et al. . | |
| 4,705,450 | 11/1987 | Gano . | |
| 4,828,452 | 5/1989 | Bolitho . | |
| 5,005,358 | 4/1991 | Hirata et al. . | |
| 5,056,615 | 10/1991 | Duthie et al. . | |
| 5,062,266 | 11/1991 | Yoshimatsu | 60/468 X |
| 5,159,813 | 11/1992 | Yoshimatsu et al. | 60/468 X |
| 5,190,445 | 3/1993 | Ikari . | |
| 5,272,877 | 12/1993 | Fukushima et al. | 60/468 X |
| 5,394,697 | 3/1995 | Hirata | 60/468 X |
| 5,636,516 | 6/1997 | Kon | 60/468 X |

*Primary Examiner*—Hoang Nguyen

*Attorney, Agent, or Firm*—Harness, Dickey & Pierce, P.L.C.

[57] ABSTRACT

An engine/pump control device for loaders is disclosed. The control device controllably distributes the output power (rotating force) of an engine to the travelling and working units of a loader in accordance with operational conditions of the loader, thus remarkably improving work efficiency of the loader. When the loader performs an operation requiring a high tractive force prior to the driving force of the working members, the control device opens the unloading valve thereby partially returning the output fluid of a hydraulic pump to a return tank while transmitting the surplus output power of the engine to the traveling unit. Meanwhile, when the loader performs an operation requiring a high driving force of the working members prior to the tractive force, the control device closes the unloading valve, thereby totally supplying the output fluid of the hydraulic pump to the actuators in order to generate a high moving speed of the working members.

13 Claims, 2 Drawing Sheets

ENGINE/PUMP CONTROL DEVICE FOR LOADERS

BACKGROUND OF THE INVENTION

1. Field of the Invention

The present invention relates, in general, to an engine/pump control device for loaders and, more particularly, to a structural improvement in such a device in order to controllably distribute the output power of an engine to the working and travelling units of a loader in accordance with operational conditions of the loader thereby improving work efficiency of the loader.

2. Description of the Prior Art

As well known to those skilled in the art, loaders are construction vehicles which dig up materials, such as sand or pebbles, and load them onto a truck.

FIG. 1 is a circuit diagram showing the construction of the hydraulic system of a loader provided with a typical engine/pump control device. As shown in FIG. 1, the hydraulic system of a loader includes two types of units, that is, a working unit and a travelling unit, which are commonly operated by the output power (rotating force) of a single engine 1. The working unit includes a plurality of hydraulic pumps 2, 3 and 4 connected to the engine 1, while the travelling unit includes a plurality of travelling wheels 16 connected to the engine through a power transmission. That is, the output power of the engine 1 is partially transmitted to the hydraulic pumps 2, 3 and 4, thereby selectively starting the pumps 2, 3 and 4. The pumps 2, 3 and 4 thus supply pressurized fluid to a plurality of cylinder actuators, thereby actuating the working members such as a boom and bucket. Meanwhile, the remaining output power of the engine 1 is transmitted to the travelling wheels 16 through a torque convertor 14 and the power transmission, thus rotating the wheels 16.

In FIG. 1, the reference numeral 9 and 10 respectively denote a bucket cylinder and a boom cylinder which are cylinder actuators for the bucket and boom. The numbers 7 and 8 respectively denote a bucket control valve and a boom control valve which are directional control valves for the bucket and boom cylinders. The control valves 7 and 8 are mounted to the fluid lines between the hydraulic pumps 2 and 3 and the actuators 9 and 10, and control the flow rate and flow direction of the pressurized fluid supplied from the pumps 2 and 3 to the actuators 9 and 10, thereby starting, stopping or changing the moving direction of the actuators 9 and 10. The hydraulic pump 4 acts as a pilot pump which generates a pilot signal pressure for the hydraulic system of the control device. The hydraulic system also includes bucket and boom control levers 11 and 12, which are selectively levered by an operator in order to appropriately apply the pilot signal pressure of the pump 4 to the bucket and boom cylinders 9 and 10.

In the drawing, the reference numerals 5 and 5' denote a relief valve which maintains a predetermined operating pressure in the hydraulic system, the numeral 13 denotes a return fluid tank, and the number 15 denotes a propeller shaft which transmits the rotating force between the front and rear wheels 16.

While the bucket of a loader digs into materials during a loading operation, the necessary amount of pressurized fluid for operating the bucket or boom cylinder 9, 10 may be reduced, while the necessary tractive force of the loader for allowing the bucket to dig into the materials must be increased. On the other hand, while the loader buckets the materials in order to load them onto a truck during the loading operation, the necessary amount of pressurized fluid for the actuator 9, 10 must be increased, while the necessary tractive force of the loader may be reduced.

In consideration of the above-mentioned characteristics of the loading operation of the loader, the typical engine/pump control device has an unloading valve 6, which is mounted to the output fluid line of the pump 3. While the bucket of the loader digs into the materials, the operating pressure of the bucket or boom cylinder 9, 10 is increased, so that the unloading valve 6 is forcibly opened and thereby brings the output fluid of the pump 3 into an unloading state. In the above state, the surplus power of the engine is transmitted to the travelling unit, thereby increasing the tractive force of the loader.

However, when the loader must bucket and load heavy materials onto a truck, the operating pressure of the bucket or boom cylinder is increased. The engine/pump control device in the above state regrettably reduces the amount of pressurized fluid for the cylinder actuators and thereby reduces the moving speed of the working members even though the loader does not perform a digging operation but performs a bucketing and loading operation. Therefore, the engine/pump control device provided with the unloading valve may fail to improve work efficiency of a loader.

During a bucketing and loading operation of a loader, it is necessary to operate the loader with a low tractive force and a high boom-up speed. However, since the maximum amount of output fluid of the pump 2, 3 associated with the boom cylinder is typically preset in accordance with the tractive force required in a normal operation, the maximum amount of output fluid of the pump 2, 3 during a bucketing and loading operation cannot not be increased even though it must be increased.

SUMMARY OF THE INVENTION

It is, therefore, an object of the present invention to provide an engine/pump control device for loaders in which the above problems can be overcome and which controllably distributes the output power of an engine to working and travelling units of a loader in accordance with operational conditions of the loader thereby remarkably improving work efficiency of the loader.

In order to accomplish the above object, the present invention provides an engine/pump control device for loaders, comprising an engine generating a rotating force for commonly driving a travelling unit and a working unit of a loader; at least one hydraulic pump receiving the rotating force of the engine and generating pressurized fluid; bucket and boom cylinders operated by the pressurized fluid from the pump and adapted for actuating the bucket and boom of the working unit, respectively; bucket and boom directional control valves controlling the amount and flow direction of the pressurized fluid supplied from the pump to the bucket and boom cylinders; bucket and boom control levers selectively levered by an operator in order to control the bucket and boom directional control valves; an unloading valve selectively returning the output fluid of the pump to a return tank in accordance with operational pressures of the bucket and boom cylinders; and a valve opening means for selectively opening the unloading valve in accordance with operational conditions of the loader.

In the preferred embodiment, the valve opening means comprises: a first sensor adapted for sensing an operational displacement of the boom; a second sensor adapted for sensing an operational displacement of the bucket; a third sensor adapted for sensing a boom-up levering motion of the boom control lever; a fourth sensor adapted for sensing a levering level of an accelerating pedal, the accelerating pedal being selectively levered by the operator in order to actuate the travelling unit; a fifth sensor adapted for sensing a levering motion of a brake pedal, the brake pedal being selectively levered by the operator in order to stop the operation of the travelling unit; an electronic proportional control valve controllably outputting pilot fluid in response to an electric control signal, thereby selectively opening the unloading valve; and a controller outputting the electric control signal to the proportional control valve in response to signals output from the first to fifth sensors.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
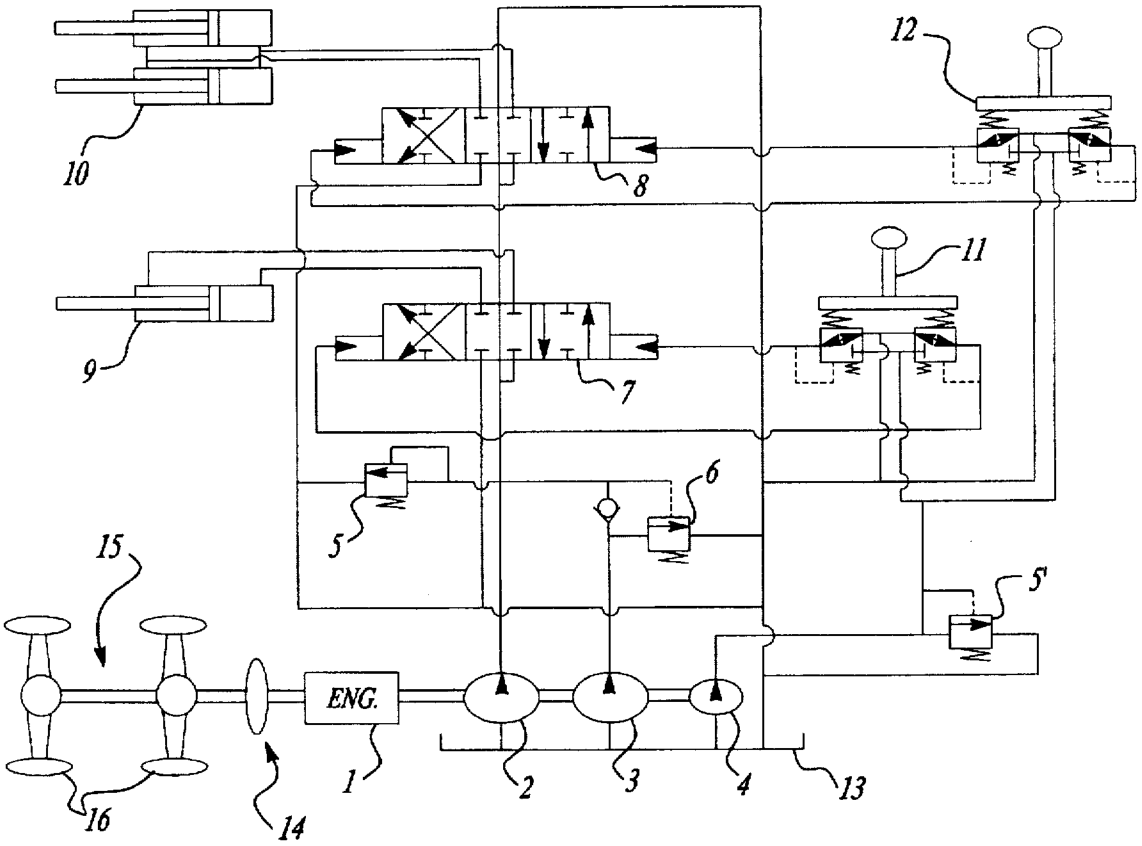
Fig-1 Prior Art
FIG. 1 is a circuit diagram showing the construction of the hydraulic system of a loader provided with a typical engine/pump control device.
Figure 2:
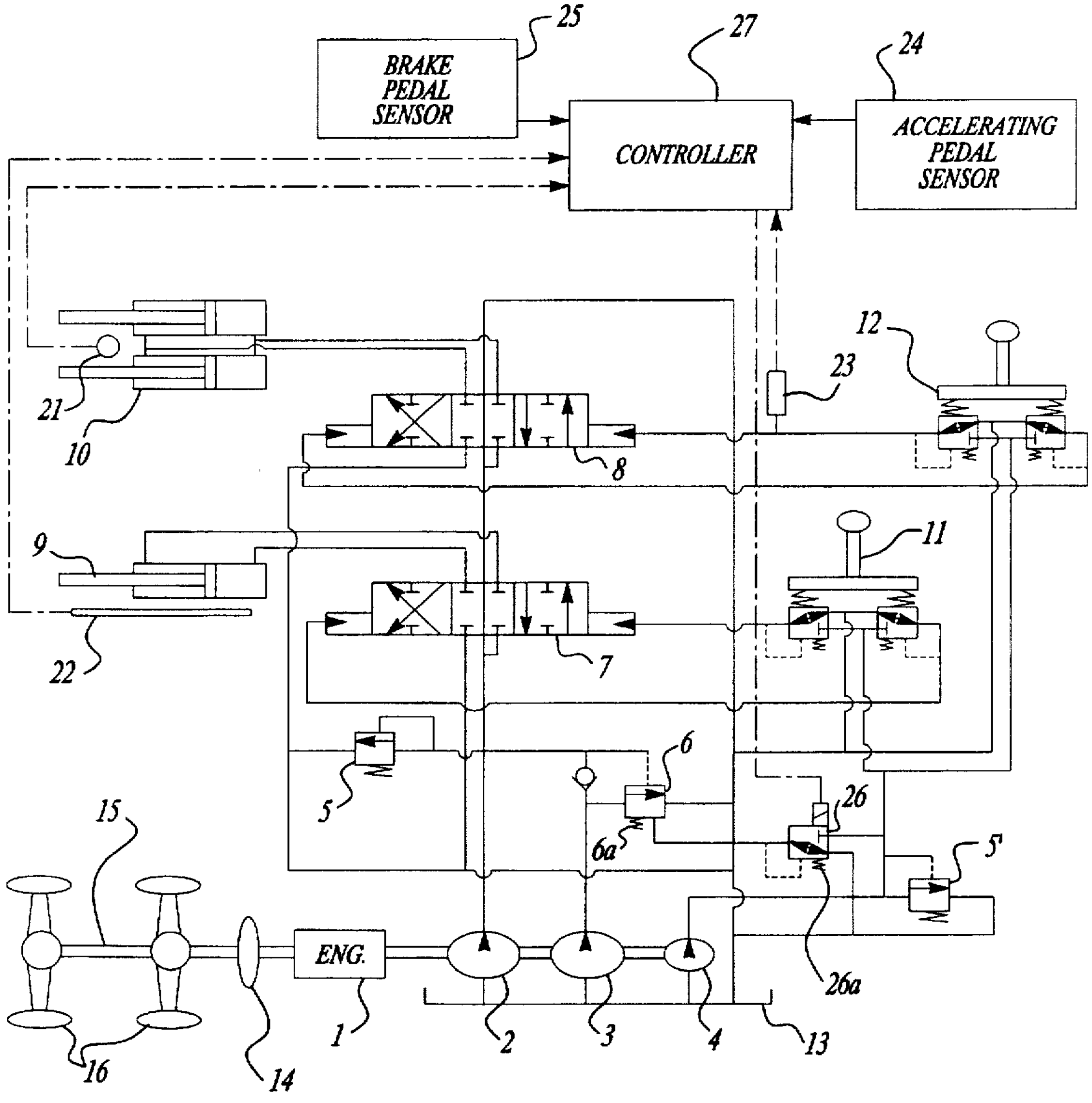
FIG. 2 is a circuit diagram showing the construction of the hydraulic system of a loader provided with the engine/pump control device in accordance with the preferred embodiment of the present invention.

FIG. 2 is a circuit diagram showing the construction of the hydraulic system of a loader provided with the engine/pump control device in accordance with the preferred embodiment of the present invention. In the engine/pump control device according to this invention, most of the elements, including the engine 1, the travelling unit having the travelling wheels and the working unit having the bucket and boom cylinders, are common with those of the prior embodiment of FIG. 1. Those elements common to both control devices according to the prior embodiment and the present invention will thus carry the same reference numerals and further explanation is not deemed necessary.

As shown in FIG. 2, the engine/pump control device of this invention includes an unloading valve 6, which is mounted to the output fluid line extending from a hydraulic pump 3. The unloading valve 6 selectively returns the output fluid of the pump 2, 3 to a return tank 13 in accordance with the operational pressures of bucket and boom cylinders and thereby brings the output fluid of the pump 2, 3 into an unloading state. In accordance with this invention, the engine/pump control device also includes a valve opening means for selectively opening the unloading valve 6 in accordance with operational conditions of a loader.

The valve opening means comprises the following sensors. That is, a boom angle sensor or first sensor 21 is mounted around the boom cylinder 10 and senses an operational displacement of a boom. A bucket angle sensor or second sensor 22 is mounted around the bucket cylinder 9 and senses an operational displacement of a bucket. A pressure switch or third sensor 23 senses a boom-up levering motion of a boom control lever 12. An accelerating pedal levering level sensor or fourth sensor 24 senses a levering level of an accelerating pedal, which operates the travelling unit. A brake pedal levering sensor or fifth sensor 25 senses a levering motion of a brake pedal, which stops the operation of the travelling unit. The valve opening means also includes an electronic proportional control valve 26, which is biased by a valve spring 26*a* and controllably outputs pilot fluid in response to an electric control signal thereby selectively opening the unloading valve 6. The valve opening means further includes a controller 27 which outputs the electric control signal to the proportional control valve 26 in response to the sensing signals output from the first to fifth sensors 21 to 25.

The unloading valve 6 is biased by a valve spring 6*a* on one end (spring-biased end) thereof and is mounted to a fluid line, which extends between the output fluid line of the pump 3 and the return tank 13. The valve 6 is set into an initial state, in which the valve 6 closes the fluid line, extending between the output line of the pump 3 and the tank 13, by the biasing force of the valve spring 6*a*. When an operational pressure of the bucket or boom cylinder 9, 10 is applied on the other end (opposite end) of the valve 6 and is higher than the biasing force of the valve spring 6*a*, the valve 6 opens the fluid line thereby returning the output fluid from the pump 2, 3 to the tank 13. The electronic proportional control valve 26 is arranged between the pilot pump 4 and the spring-biased end of the unloading valve 6. The above proportional control valve 26 is set into an initial state, in which the control valve 26 applies a signal pressure of the pilot pump 4 to the spring-biased end of the unloading valve 6 due to the valve spring 6*a*. When a pressure increase signal (electric signal) is applied from the controller 27 to the opposite end of the spring-biased proportional control valve 26, the control valve 26 shuts down transmission of the signal pressure of the pilot pump 4 to the unloading valve 6. The pilot fluid of the pump 4 in the above state returns to the tank 13. That is, when a pressure increase signal is applied to the proportional control valve 26, the unloading valve 6 closes the fluid line extending to the return tank 13, so that the output fluid from the pump 3 is totally fed to the bucket and boom cylinders 9 and 10 through their directional control valves 7 and 8. Meanwhile, when a pressure reduction signal (electric signal) is applied to the proportional control valve 26, the unloading valve 6 opens the fluid line extending to the return tank 13, so that the output fluid from the pump 3 partially returns to the return tank 13.

The operational effect of the engine/pump control device of this invention will be described hereinbelow.

In operation of the engine/pump control device, the controller 27 receives the signals from the first to fifth sensors 21 to 25 and operates the input signals, thereby discriminating the present operation performed by the loader. For example, in the case of the following conditions: the signals from the boom and bucket angle sensors (first and second sensors) 21 and 22 indicate that the bucket digs into a particular material; the signal from the accelerating pedal levering level sensor (fourth sensor) 24 indicates that the accelerating pedal is levered with a level of higher than a preset reference level; and the signal from the brake pedal levering motion sensor (fifth sensor) 25 indicates that the brake pedal is not levered, the controller 27 determines that the loader performs a digging operation which requires a high tractive force prior to the driving force of the working members. On the other hand, in the case of the following conditions: the signal from the pressure sensor (third sensors) 23 indicates that the boom moves up; the signal from the accelerating pedal levering level sensor 24 and the signal from the brake pedal levering motion sensor indicates that the accelerating and brake pedals are levered with a level of higher than the preset reference level, the controller 27 determines that the loader performs a bucketing and loading operation which requires a high driving force of the working members prior to the tractive force of the loader.

When the controller 27 determines that the loader performs an operation which requires a high tractive force prior to the driving force of the working members, the controller 27 outputs a pressure reduction signal to the electronic proportional control valve 26. Therefore, the unloading valve 6 is opened, thereby causing the output fluid from the pump 3 to partially return to the tank 13. In the above state, the surplus power (rotating force) of the engine is transmitted to the travelling unit thereby generating a high tractive force which effectively performs the necessary operation.

When the controller 27 determines that the loader performs an operation, which requires a high driving force of the working members prior to the tractive force, while simultaneously moving up the boom, the controller 27 outputs a pressure increase signal to the electronic proportional control valve 26. Therefore, the unloading valve 6 is closed, thereby causing the output fluid from the pump 3 to be totally supplied to the boom cylinder 10. In the above state, the loader effectively performs the necessary operation with a high moving speed of the boom.

As described above, the present invention provides an engine/pump control device for loaders. The engine/pump control device of this invention controllably distributes the output power (rotating force) of an engine to the travelling and working units of a loader in accordance with operational conditions of the loader, thus remarkably improving work efficiency of the loader. That is, when the loader performs an operation, for example, a digging operation requiring a high tractive force prior to the driving force of the working members, the control device opens the unloading valve thereby partially returning the output fluid of a hydraulic pump to a return tank while transmitting the surplus output power of the engine to the traveling unit. Meanwhile, when the loader performs an operation, for example, a bucketing and loading operation, requiring a high driving force of the working members prior to the tractive force, the control device closes the unloading valve, thereby totally supplying the output fluid of the hydraulic pump to the actuators and generating a high moving speed of the working members. The engine/pump control device of this invention thus remarkably improves work efficiency of loaders.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. An engine/pump control device for loaders, said control device comprising:

an engine generating a rotating force for commonly driving a travelling unit and a working unit of the loader;

at least one hydraulic pump receiving the rotating force of said engine and generating pressurized output fluid;

bucket and boom cylinders operated by said pressurized fluid from said pump and adapted for actuating a bucket and a boom of said working unit, respectively;

bucket and boom directional control valves controlling the amount and flow direction of said pressurized fluid supplied from said pump to said bucket and boom cylinders;

bucket and boom control levers selectively levered by an operator in order to control said bucket and boom directional control valve;

an unloading valve selectively returning said output fluid of said pump to a return tank in accordance with operational pressures of said bucket and boom cylinders;

sensors for sensing operation of said working unit and said travelling unit;

a proportional control valve controllably outputting pilot fluid for opening said unloading valve; and a controller outputting a control signal to said proportional control valve in response to signals from said sensors.

2. The engine/pump control device according to claim 1, wherein said sensors comprise:

a first sensor for sensing an operational displacement of said boom;

a second sensor for sensing an operation displacement of said bucket;

a third sensor for sensing a boom-up levering motion of said boom control lever;

a fourth sensor for sensing a levering level of an accelerating pedal, said accelerating pedal being selectively levered by the operator in order to actuate said travelling unit; and a fifth sensor for sensing a levering motion of a brake pedal, said brake pedal being selectively levered by the operator in order to stop the operation of said travelling unit.

3. A hydraulic drive system for actuating a work device of a construction vehicle, said hydraulic drive system comprising:

at least one hydraulic pump for generating pressurized fluid;

at least one cylinder for actuating the work device of the construction vehicle being driven by said pressurized fluid;

at least one unloading valve selectively returning said pressurized fluid of said at least one hydraulic pump to a tank in response to operational pressures of said at least one cylinder;

at least one sensor for sensing an operational condition of the construction vehicle and outputting a sensor signal in response thereto;

a controller for receiving said sensor signal from said at least one sensor and outputting an electric control signal; and an electronic proportional control valve for receiving said electric control signal from said controller and outputting pilot fluid for selectively opening said at least one unloading valve.

4. The hydraulic drive system according to claim 3 wherein said at least one sensor further includes a boom sensor for sensing an operational displacement of a boom of the construction vehicle and outputting a boom sensor signal in response thereto.

5. The hydraulic drive system according to claim 4 wherein said at least one sensor further includes a bucket sensor for sensing an operational displacement of a bucket of the construction vehicle and outputting a bucket sensor signal in response thereto.

6. The hydraulic drive system according to claim 5 wherein said at least one sensor further includes a control lever sensor for sensing a levering motion of a control lever of the construction vehicle and outputting a control lever sensor signal in response thereto.

7. The hydraulic drive system according to claim 6 wherein said at least one sensor further includes an accelerator pedal sensor for sensing a levering motion of an accelerator pedal of the construction vehicle and outputting an accelerator pedal sensor signal in response thereto.

8. The hydraulic drive system according to claim 7 wherein said at least one sensor further includes a brake pedal sensor for sensing a levering motion of a brake pedal of the construction vehicle and outputting a brake pedal sensor signal in response thereto.

9. The hydraulic drive system according to claim 8 wherein said at least one sensor further includes a pressure sensor for sensing a boom-up levering motion of a boom control lever of the construction vehicle and outputting a pressure sensor signal in response thereto.

10. The hydraulic drive system according to claim 9 further comprising:

an engine for commonly driving said at least one hydraulic pump and a traveling unit of the construction vehicle.

11. The hydraulic drive system according to claim 10 whereupon said controller detecting a digging operation from said bucket sensor signal and said boom sensor signal and further detecting a levering operation from said accelerator pedal sensor signal, said controller outputs a pressure reduction signal to said electronic proportional control valve causing said unloading valve to open, thereby allowing surplus power of said engine to be transmitted to said traveling unit of the construction vehicle to generate an increased tractive force.

12. The hydraulic drive system according to claim 9 wherein said at least one hydraulic cylinder includes a boom cylinder for actuating said boom of the construction vehicle.

13. The hydraulic drive system according to claim 12 whereupon said controller detecting a bucketing and loading operation from said pressure sensor signal and further detecting a levering operation from said accelerator pedal sensor signal and said brake pedal sensor signal, said controller outputs a pressure increase signal to said electronic proportional control valve causing said unloading valve to close, thereby causing said pressurized fluid from said at least one hydraulic pump to be supplied to said boom cylinder of the construction vehicle to generate an increased moving speed of said boom.

* * * * *